A. J. ANDERSON.
ATTACHMENT FOR PLANTERS.
APPLICATION FILED MAY 29, 1912.

1,050,903.

Patented Jan. 21, 1913.

2 SHEETS—SHEET 1.

Witnesses:
E. C. Skinkle
Geo. Knutson

Inventor:
Adolph J. Anderson
By his Attorneys,
Williamson Merchant

A. J. ANDERSON.
ATTACHMENT FOR PLANTERS.
APPLICATION FILED MAY 29, 1912.

1,050,903.

Patented Jan. 21, 1913.
2 SHEETS—SHEET 2.

Witnesses:
E. C. Skinkle
Geo. Knutson

Inventor:
Adolph J. Anderson
By his Attorneys:
Williamson Merchant

UNITED STATES PATENT OFFICE.

ADOLPH J. ANDERSON, OF HOUSTON, MINNESOTA.

ATTACHMENT FOR PLANTERS.

1,050,903.  Specification of Letters Patent.  Patented Jan. 21, 1913.

Application filed May 29, 1912. Serial No. 700,368.

*To all whom it may concern:*

Be it known that I, ADOLPH J. ANDERSON, a citizen of the United States, residing at Houston, in the county of Houston and State of Minnesota, have invented certain new and useful Improvements in Attachments for Planters; and I do hereby declare the following to be a full, clear, and exact description of the invention, such as will enable others skilled in the art to which it appertains to make and use the same.

My invention relates to planters and has for its especial object to provide an attachment for coöperation with the furrow opener thereof.

The purpose of the improved attachment is to smooth the furrow as it is opened up by the furrow opening blade, to brush aside all obstacles such as stones, sod, and corn stalks, and to regulate the depth of the furrow to insure the planting of drop seeds at a proper and uniform depth.

Particularly my invention is in the nature of an improvement on my two prior U. S. patents identified as follows, towit: No. 941,485, issued of date November 30, 1909, entitled "Corn planter" and No. 984,731, issued of date February 21, 1911, entitled "Attachment for planting", and provides better means for adjustably and detachably connecting the so-called shoe wings to planters of different makes wherein the furrow opening blades and seed boots are of different sizes and form.

To the above ends, the invention consists of the novel devices and combinations of devices hereinafter described and defined in the claims.

The invention is illustrated in the accompanying drawings, wherein like characters indicate like parts throughout the several views.

Figure 1:
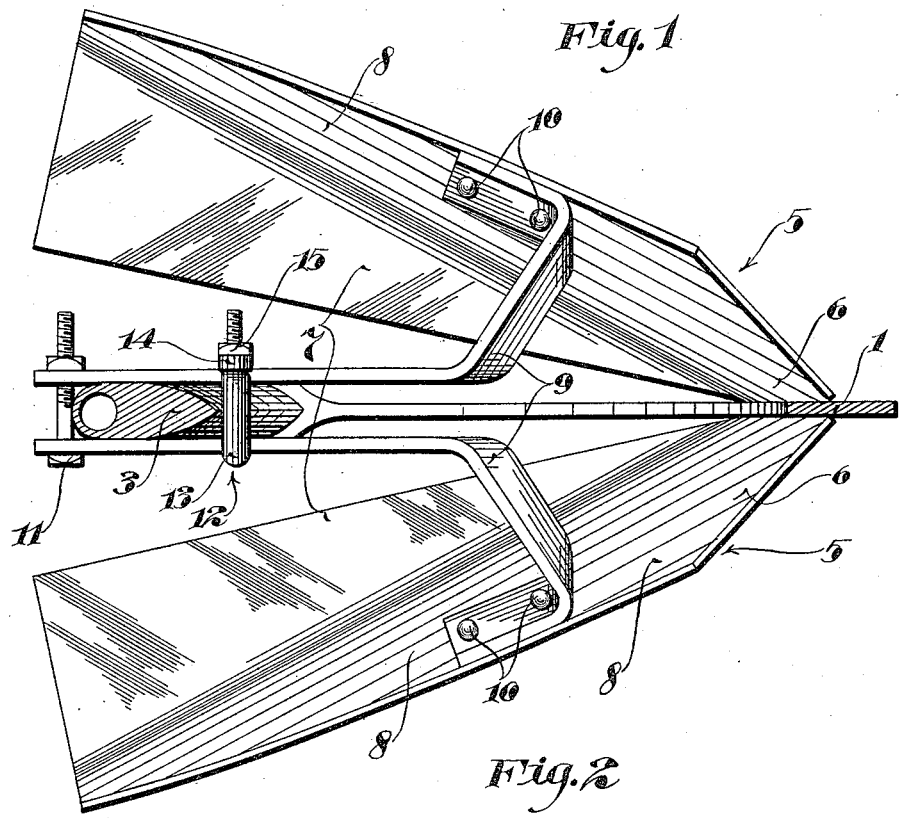
Figure 2:
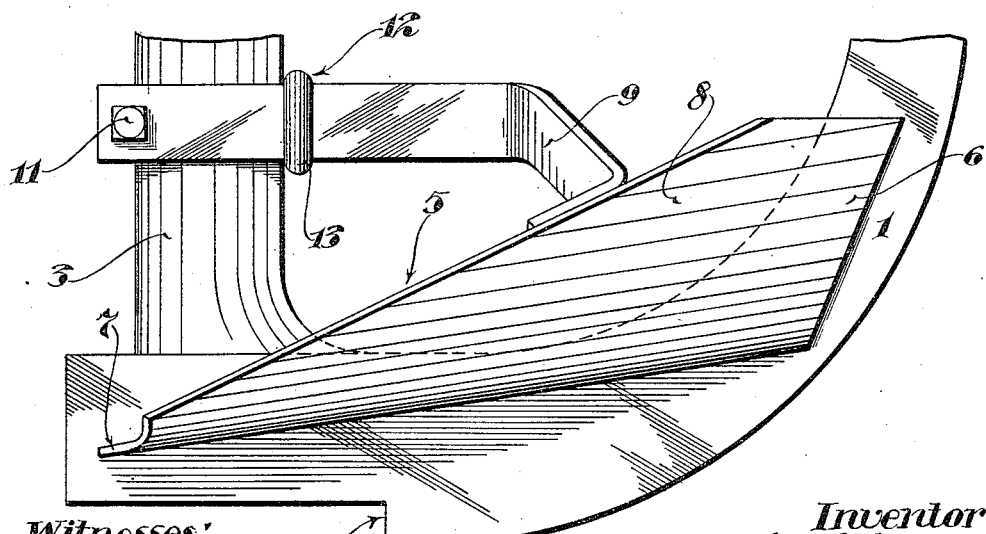
Figure 3:
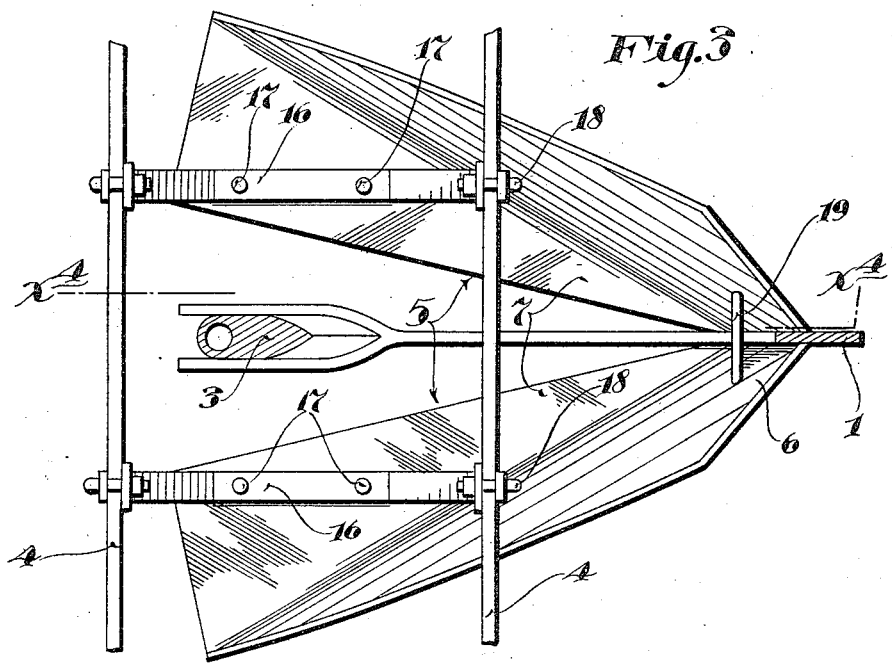
Figure 4:
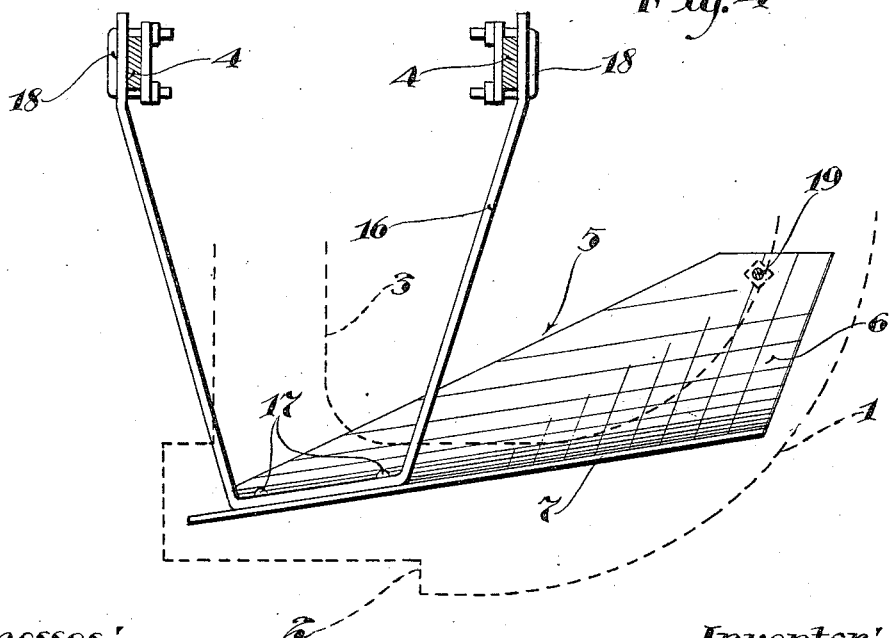

Referring to the drawings,—Figure 1 is a plan view of the improved attachment applied in working position to the furrow opening blade and seed boot of the planter, some parts of which are shown in section; Fig. 2 is a side elevation of the parts shown in Fig. 1; Fig. 3 is a view corresponding to Fig. 1 but showing different means for supporting the improved attachment; and Fig. 4 is an inside side elevation of one of the so-called shoe wings with some parts of the supporting frame sectioned on the line $x^4$ $x^4$ of Fig. 3, the furrow opening blade and seed boot being indicated by dotted lines.

The planter shoe comprises a forwardly and upwardly curved furrow opening blade 1 cut away at the rear end portion of its cutting surface, as indicated by the numeral 2. Rigidly secured to the rear upper surface of the furrow opening blade 1, directly over the cut away portion 2, is an upwardly extended seed boot 3. The furrow opening blade 1 and seed boot 2 are secured to a suitable supporting frame 4, only a portion of which is shown in Figs. 3 and 4. The parts thus far described may be of the standard or any suitable construction.

The improved attachment is in the form of a pair of shoe wings 5 terminating at their front ends in flat upwardly extended converging portions 6 which engage and are pressed against the forwardly upturned portion of the furrow opening blade 1. The outer edges of the converging portions 6 are inclined outwardly and upwardly along lines intermediately between the front and rear edges of the upwardly curved furrow opening blade 1, as best shown in Fig. 2. These edges are also beveled so that they lie flat on the sides of the furrow opening blade 1, as shown in Figs. 1 and 3. From the lower edges of the converging portions 6, the shoe wings 5 terminate in rearwardly diverging flat surfaces 7, the outer edges of which are outwardly and upwardly curved to form vertically inclined side flanges 8. These side flanges form continuations of the converging portions 6 and diverge rearwardly therefrom.

Referring to the means illustrated in Figs. 1 and 2 for supporting the shoe wings 5, the numeral 9 indicates a pair of heavy supporting bars that are rigidly secured, at their forward ends, to the upper inner faces of the side flanges 8 intermediately between the ends thereof, by means of rivets 10. From their forward connected ends, the bars 9 first converge upwardly and rearwardly and then extend parallel in a horizontal rearward direction and embrace the seed boot 3. At their free rear ends, the bars 9 extend slightly beyond the seed boot 3 and are detachably connected by means of a horizontally extended draw bolt 11. Slidably mounted on the bars 9, in advance of the seed boot 3, is a clip 12 comprising a yoke 13 having slidably mounted on its prongs a clamping bar 14. The yoke 13 and bar 14 embrace the bars 9 and are frictionally clamped thereon by means of nuts 15 having screw threaded engagement with the ends of the prongs of the yoke 13. As is evident, the draw bolt 11 and clip 12 frictionally and adjustably clamp the bars 9 onto the seed boot 3 and thereby support the shoe wings 5 in their proper relation to the furrow opening blade 1 and are entirely free therefrom. By moving the bars 9 up or down on the seed boot 3, the positions of the shoe wings 5 may be changed, at will, to vary the depth of the furrow. It is also evident that the clip 12 can be slid horizontally on the bars 9 toward and from the draw bolt 11 thereby making the improved attachment adjustable to planters having seed boots of different sizes. And by adjusting the draw bolt 11 and the clip 12 with respect to each other, the angularity of the bars 9 can be varied to force the converging portions 6 of the shoe wings 5 onto the furrow opening blade 1, irrespective of its thickness.

Referring now to the construction shown in Figs. 3 and 4 of the drawings, the only difference from that shown in Figs. 1 and 2 is in the means for supporting the shoe wings 5. In this construction, each shoe wing 5 is independently suspended from the supporting frame 4 by means of a U-shaped bar 16. The intermediate portions of these bars 16 extend horizontally in the direction of the travel of the machine and are rigidly secured to the flat surfaces 7, of the wings 5, by means of rivets 17. At their upper ends the bars 16 are detachably secured to the supporting frame 4, by means of clips 18 of substantially the same form as the clip 12. In this construction, the converging portions 6, of the shoe wings 5 are preferably connected, as shown, by means of a horizontally extended draw bolt 19 passed over and resting upon the upper edge of the furrow opening blade 1.

What I claim is:—

1. In a planter, the combination with a furrow opener having a forwardly extended upturned portion, of a pair of shoe wings having forwardly converging portions engaging the sides of the upturned portion of said furrow opener, and common means entirely independent from the furrow opener supporting said shoe wings in operative positions with respect to said furrow opener, and which means is adjustable for moving the forwardly converging portions of said shoe wings toward and from each other, substantially as described.

2. In a planter, the combination with a furrow opener having a forwardly extended upturned portion, of a pair of shoe wings having forwardly converging portions engaging the sides of the upturned portion of said furrow opener, a pair of supporting bars rigidly secured, one to each of said shoe wings, and means for adjusting said bars to positively move the forward converging portions of said shoe wings toward and from each other, substantially as described.

3. In a planter, the combination with a furrow opener and a seed boot rigidly secured thereto, said furrow opener having a forwardly extended upturned portion, of a pair of shoe wings having forwardly converging portions engaging the sides of the upturned portion of said furrow opener, a pair of rearwardly extended supporting bars rigidly secured at their forward ends, one to each of said wings, and at their rear ends embracing said seed boot, and a draw bolt and a clip connecting said supporting bar at the front and rear of said seed boot and adapted to frictionally and adjustably clamp said bars onto said seed boot, said clip being adjustably mounted on said bars for movement toward and from the seed boot, substantially as described.

In testimony whereof I affix my signature in presence of two witnesses.

ADOLPH J. ANDERSON.

Witnesses:
HENRY HANSON,
G. E. STEVES.

Copies of this patent may be obtained for five cents each, by addressing the "Commissioner of Patents, Washington, D. C."